UNITED STATES PATENT OFFICE.

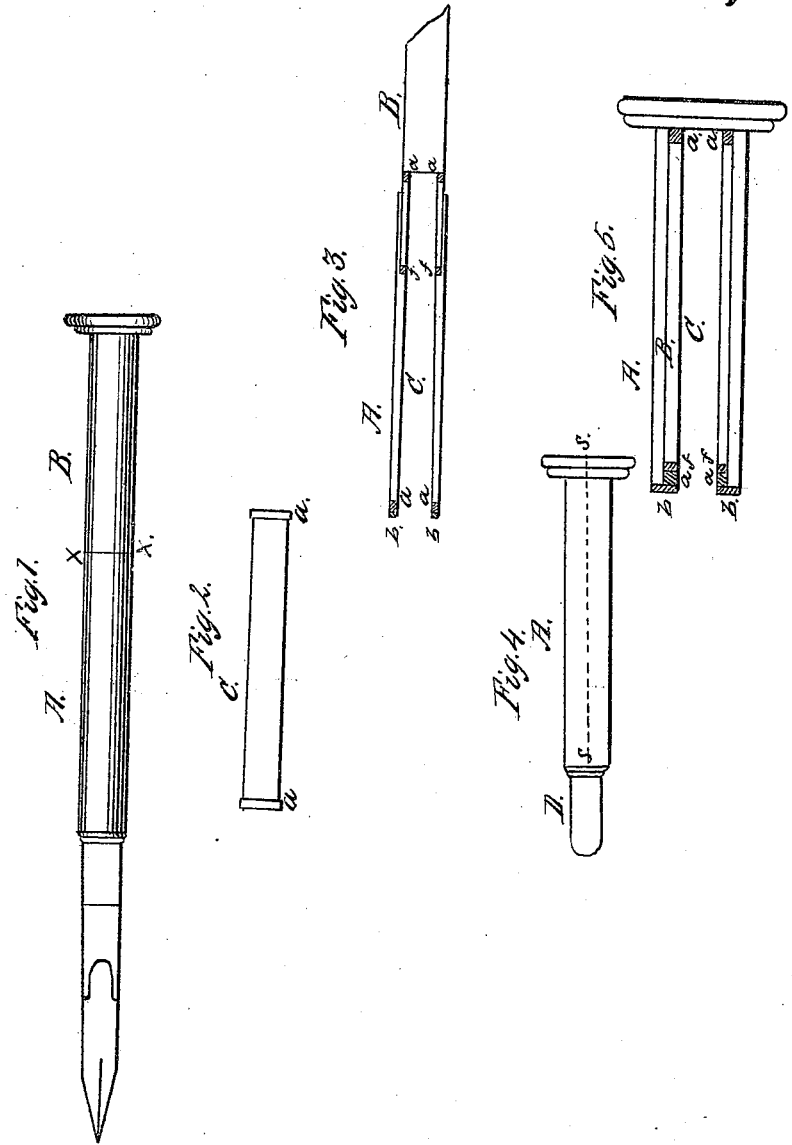

ALBERT G. BAGLEY, OF NEW YORK, N. Y.

IMPROVEMENT IN PEN AND PENCIL CASES.

Specification forming part of Letters Patent No. 6,981, dated January 1, 1850.

*To all whom it may concern:*

Be it known that I, ALBERT G. BAGLEY, of the city, county, and State of New York, have invented a new and useful Improvement on Pen and Pencil Cases; and I hereby do declare that the following is a full, clear, and exact description, reference being had to the annexed drawings, forming part of this specification, in which—

Figure 1 is a view of the pen-case drawn out to its fullest extent. Fig. 2 is a view of the interior auxiliary tube. Fig. 3 is a section showing the sliding tube nearly drawn out. Fig. 4 is a view of the pen-case closed. Fig. 5 is an enlarged horizontal section of the pen-case, taken at the line *s s*, Fig. 3, showing the arrangement of the three tubes which compose the pen-case.

The same letters refer to like parts on all the figures.

The nature of my invention consists in providing an auxiliary interior tube to lock with the sliding outside tube to make a stronger pen-case than those heretofore used and to make the two outside tubes fit closer together, making a neater joint and a longer pen-case when drawn out for writing.

To enable others skilled in the art to make and use my invention, I will proceed to describe its construction and operation.

A B are the two outside tubes. The former is the fixed and the latter is the sliding tube.

C is the interior auxiliary tube. It is made of any kind of common suitable metal. *a a* are two ferrules soldered on it at the ends outside.

On the lower end of the tube A, inside, there is a ferrule *b* soldered to it. The tube C is placed inside of the tube A and soldered to it, the one ferrule *a* being soldered to the ferrule *b*, as represented in Fig. 3, thus firmly uniting the interior with the outside tube, having a small space or chamber between them for the tube B to slide in. On the lower end of this sliding tube, inside, there is soldered a small ferrule *f*. This ferrule locks the sliding tube with the interior tube by the ferrule *f* catching under or below the upper ferrule *a* of the tube C. The three tubes are thus united together, with upper tube B left free to slide between the tubes A and C, and it is prevented from being drawn out, when it is extended, by the ferrule *f* catching or locking with the ferrule *a* on the upper end of the interior tube.

The pen-cases at present in use are each made of two outside tubes only, the one of less diameter than the other and made to slide inside of it to decrease its length, the two tubes being locked together by a ferrule soldered inside of the fixed tube at the upper end, and a ferrule soldered on the outside of the sliding tube at the lower end. This arrangement makes a very clumsy joint at X X. My improvement remedies this evil, as the two outside cases fit close together without a ferrule intervening between them, and thus I am enabled to form a far handsomer pen-case. In the old pen-case the ferrules are thicker and broader than those in the case herein described, for the purpose of imparting the required stiffness to the outside tubes, which are made very thin. By employing my interior auxiliary tube the outside tubes may be made of greater thinness, and in gold pen-cases this will effect a great saving and allow a cheaper pen-case to be manufactured. My auxiliary tube gives great stiffness and strength to the seat or sheath of the pen-stock D to retain it firmly while writing, and rendering it more durable also.

The tubes A B may be reversed in position to allow the sliding tube to be extended or drawn out downward; but I prefer the arrangement herein set forth, although the joint at X X, formed in both cases, would be equally good and alike.

Having thus described my invention, I claim—

The auxiliary interior tube C, in combination with the two ouside tubes A and B, in the manner substantially as herein described, and for the purpose set forth.

A. G. BAGLEY.

Witnesses:
L. H. HOUGHTON,
A. MORTON.